United States Patent
Lee

(10) Patent No.: US 10,563,992 B2
(45) Date of Patent: Feb. 18, 2020

(54) METHOD AND APPARATUS FOR OPTIMAL PATH GENERATION

(71) Applicant: HANWHA DEFENSE CO., LTD., Changwon-si (KR)

(72) Inventor: JinHan Lee, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 257 days.

(21) Appl. No.: 15/356,914

(22) Filed: Nov. 21, 2016

(65) Prior Publication Data

US 2017/0201457 A1    Jul. 13, 2017

(30) Foreign Application Priority Data

Jan. 7, 2016 (KR) .......................... 10-2016-0002082

(51) Int. Cl.
*G01C 21/34* (2006.01)
*H04L 12/24* (2006.01)

(52) U.S. Cl.
CPC ...... *G01C 21/3446* (2013.01); *H04L 41/0816* (2013.01); *G01C 21/34* (2013.01)

(58) Field of Classification Search
None
See application file for complete search history.

(56) References Cited

U.S. PATENT DOCUMENTS

| | | | | |
|---|---|---|---|---|
| 2009/0276194 A1* | 11/2009 | Kidera | .................. | G06T 11/203 703/1 |
| 2010/0076640 A1* | 3/2010 | Maekawa | ............ | G05D 1/0217 701/26 |

FOREIGN PATENT DOCUMENTS

| | | |
|---|---|---|
| JP | 2010-73080 A | 4/2010 |
| JP | 2014-26516 A | 2/2014 |
| KR | 10-2012-0098152 A | 9/2012 |

OTHER PUBLICATIONS

Elbanhawi, M., Simic, M., & Jazar, R. N. (2015). Continuous path smoothing for car-like robots using B-spline curves. Journal of Intelligent & Robotic Systems, 80, 23-56. doi:http://dx.doi.org/10.1007/s10846-014-0172-0 (Year: 2015).*

* cited by examiner

*Primary Examiner* — Ayaz R Sheikh
*Assistant Examiner* — Sori A Aga
(74) *Attorney, Agent, or Firm* — Sughrue Mion, PLLC

(57) ABSTRACT

A method for optimal path generation includes generating a candidate path to be taken by a platform to move from a start point to a final point, splitting the candidate path into a preset number of sections, calculating a curvature variation of each of the sections, acquiring an optimal path parameter that minimizes a sum of the curvature variations, by changing a path parameter of the candidate path, and determining, as the candidate path corresponding to the optimal path parameter as an optimal path.

10 Claims, 5 Drawing Sheets

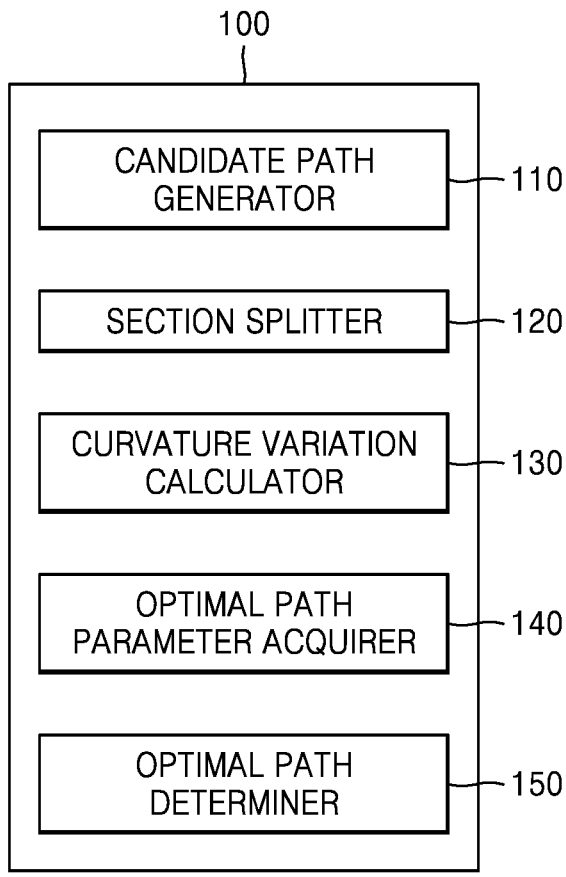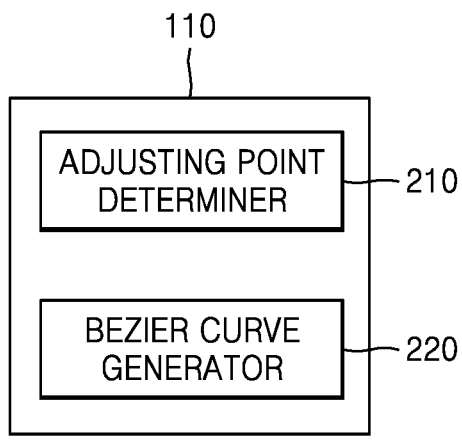

METHOD AND APPARATUS FOR OPTIMAL PATH GENERATION

CROSS-REFERENCE TO THE RELATED APPLICATION

This application claims priority from Korean Patent Application No. 10-2016-0002082, filed on Jan. 7, 2016, in the Korean Intellectual Property Office, the disclosure of which is incorporated herein in its entirety by reference.

BACKGROUND

1. Field

Apparatuses and methods consistent with exemplary embodiments relate to optimal path generation, and more particularly, to optimal path generation by using a Bezier curve.

2. Description of the Related Art

To connect two points, a Bezier curve is widely used as a flexible curve that allows unlimited adjusting of magnification. The Bezier curve may also be used to generate a movement path of a mobile robot connecting a start point and a final point to each other.

SUMMARY

One or more exemplary embodiments provide a method and apparatus for optimal path generation, whereby a movement path having high realizability may be provided when a mobile robot is driven, by minimizing a curvature variation between a start point and a final point.

Various aspects will be set forth in part in the description which follows and, in part, will be apparent from the description, or may be learned by practice of the presented exemplary embodiments.

According to one or more exemplary embodiments, there is provided a method for optimal path generation. The method may include: generating a candidate path to be taken by a platform to move from a start point to a final point; splitting the candidate path into a preset number of sections; calculating a curvature variation of each of the sections; acquiring an optimal path parameter that minimizes a sum of the curvature variations, by changing a path parameter of the candidate path; and determining, as an optimal path, the candidate path corresponding to the optimal path parameter.

The generating the candidate path may include determining adjusting points based on the path parameter; and generating a Bezier curve based on the adjusting points.

The determining the adjusting points may include determining four adjusting points based on the path parameter, state information of the platform at the start point, and state information of the platform at the final point, and the generating of the Bezier curve may include generating a quintic Bezier curve based on the four adjusting points.

According to one or more exemplary embodiments, there is provided an apparatus for optimal path generation which may include: a candidate path generator configured to generate a candidate path to be taken by a platform to move from a start point to a final point; a section splitter configured to split the candidate path into a preset number of sections; a curvature variation calculator configured to calculate a curvature variation of each of the sections; an optimal path parameter acquirer configured to acquire an optimal path parameter that minimizes a sum of the curvature variations, by changing a path parameter of the candidate path; and an optimal path determiner configured to determine the candidate path corresponding to the optimal path parameter as an optimal path.

BRIEF DESCRIPTION OF THE DRAWINGS

These and/or other aspects will become apparent and more readily appreciated from the following description of the exemplary embodiments, taken in conjunction with the accompanying drawings, in which:

FIG. 1 is a block diagram of a structure of an apparatus for optimal path generation, according to an exemplary embodiment;

FIG. 2 illustrates an example of a candidate path generator included in the apparatus for optimal path generation of FIG. 1, according to an exemplary embodiment;

DETAILED DESCRIPTION

Figure 3:
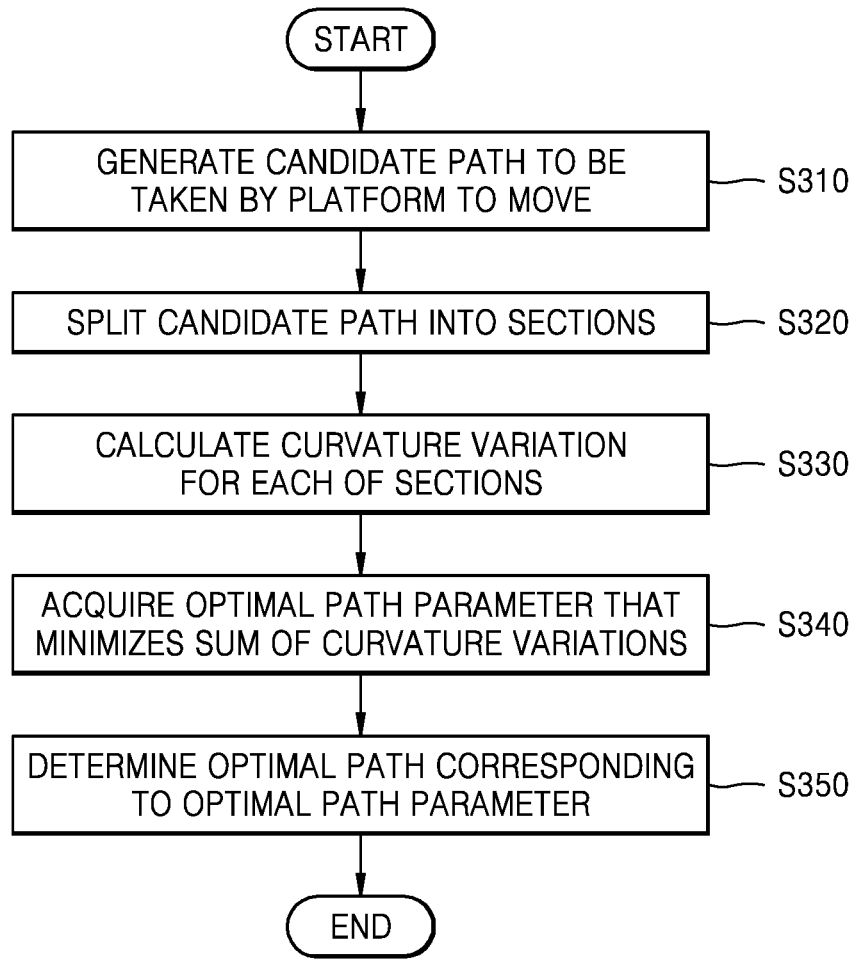
FIG. 3 is a flowchart of a method for optimal path generation, according to an exemplary embodiment.

As the inventive concept allows for various changes and numerous embodiments, particular exemplary embodiments will be illustrated in the drawings and described in detail in the written description. However, this is not intended to limit the inventive concept to particular modes of practice or the presented embodiments, and it is to be appreciated that all changes, equivalents, and substitutes that do not depart from the spirit and technical scope of the inventive concept are encompassed in the inventive concept. In the description of the exemplary embodiments, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe particular embodiments, and are not intended to limit the scope of the inventive concept. An expression used in the singular encompasses the expression of the plural, unless it has a clearly different meaning in the context. In embodiments below, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments including FIGS. 1-4 may be described in terms of functional block components and various processing steps. Such functional blocks may be realized by any number of hardware and/or software components configured to perform the specified functions. For example, the functional blocks may employ various integrated circuit (IC) components, e.g., memory elements, processing elements or processors, logic elements, look-up tables, and the like, which may carry out a variety of functions under the control of one or more microprocessors or other control devices. Similarly, where elements in the exemplary embodiments described herein are implemented using software programming or software elements, the embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments described herein could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

Like reference numerals in the specification and drawings denote like elements, and thus their description will be omitted.

FIG. 1 is a block diagram of a structure of an apparatus for optimal path generation, according to an exemplary embodiment.

Referring to FIG. 1, an apparatus 100 for optimal path generation according to an exemplary embodiment includes a candidate path generator 110, a section splitter 120, a curvature variation calculator 130, an optimal path parameter acquirer 140, and an optimal path determiner 150.

The candidate path generator 110 generates a candidate path to be taken by a platform to move from a start point to a final point.

The platform may be a mobile robot having a predetermined length and a predetermined width.

The candidate path generator 110 may generate a candidate path to be taken by a center point of the platform to move from the start point to the final point. The candidate path generator 110 may generate a candidate path connecting the start point and the final point to each other in a Bezier curve shape.

According to an exemplary embodiment, the section splitter 120 splits the candidate path into a preset number of sections. According to an exemplary embodiment, the section splitter 120 may split the candidate path into a plurality of sections at a preset time interval. The preset time interval is defined as a section interval. According to an exemplary embodiment, the section splitter 120 may split the candidate path into a plurality of sections at a preset distance interval. The preset distance interval is defined as a section interval.

The curvature variation calculator 130 calculates a curvature variation at each of the sections of the candidate path. The curvature variation calculator 130 may calculate a curvature variation for each of the sections by using (n−1) splitting points for splitting the candidate path into n sections and curvature values at both end points of the candidate path. In this case, (n+1) points obtained by adding the (n−1) splitting points for splitting the candidate path into n sections to both end points of the candidate path are defined as curvature calculating points.

The curvature variation calculator 130 may calculate a curvature variation of a specific section by dividing a difference between a curvature of a start point of the specific section and a curvature of a final point of the specific section by the section interval. In this case, a start point of an n-th section may be an n-th curvature calculating point, and a final point the n-th section may be an (n+1)th curvature calculating point. In other words, the curvature variation calculator 130 may calculate a curvature variation of the n-th section by dividing a difference between a curvature of the n-th curvature calculating point and a curvature of the (n+1)th curvature calculating point by the section interval.

According to an exemplary embodiment, a curvature variation may always be represented as a positive number by applying an absolute value.

The optimal path parameter acquirer 140 acquires an optimal path parameter that minimizes a sum of the curvature variations, by changing a path parameter of the candidate path.

The path parameter may be a parameter required for specifying the candidate path. For example, when the candidate path is generated in a Bezier curve shape, the path parameter may be a parameter required for determining an adjusting point for specifying the Bezier curve.

According to an exemplary embodiment, the optimal path parameter acquirer 140 may acquire an optimal path parameter that minimizes a sum of the squares of the curvature variations. In this case, even when the curvature variation calculator 130 does not apply absolute values to the curvature variations, the curvature variation calculator 130 may acquire the same result. When the curvature variation calculator 130 performs a Jacobian calculation to acquire an optimal path parameter, the curvature variation calculator 130 may reduce the number of required calculations, compared with when the curvature variation calculator 130 applies absolute values to the curvature variations.

The sum of the curvature variations or the sum of the squares of the curvature variations may be used as a performance index (IP), which is an evaluation index of the candidate path. For example, the IP may be the same as Equation 1.

$$J(h) = \sum_{j=0}^{n-1} c_j^2(h), \; c_j = \frac{(k_{j+1} - k_j)}{s_j}, \tag{1}$$

where J(h) may indicate the IP, n may indicate the number of sections into which the candidate path is split, $c_j$ may indicate a curvature variation at a j-th section, $k_j$ may indicate a j-th curvature calculating point, and $s_j$ may indicate the section interval.

The optimal path determiner 150 determines, as an optimal path, a candidate path corresponding to the optimal path parameter.

As such, in an optimal path generating method according to an exemplary embodiment, a high-realizable movement path may be provided by providing a path on which a curvature variation between a start point and a final point is minimized.

FIG. 2 illustrates an example of the candidate path generator 110 of FIG. 1, according to an exemplary embodiment.

The candidate path generator 110 of FIG. 1 may include an adjusting point determiner 210 and a Bezier curve generator 220.

The adjusting point determiner 210 determines adjusting points by using the path parameter. Specifically, the adjusting point determiner 210 may determine four adjusting points by using state information of a platform at a start point, state information at the platform of a final point, and Equations 2 below.

$$B_0 = p_s = (x_s, y_s)^T \quad (2)$$

$$B_1 = p_s + a\hat{\theta}_s, \qquad \hat{\theta}_s = (\cos\theta_s, \sin\theta_s)^T$$

$$B_2 = p_s + (a+b)\hat{\theta}_s + \frac{5}{4}a^2\kappa_s\dot{\hat{\theta}}_s, \qquad \hat{\theta}_s = (\cos\theta_s, \sin\theta_s)^T, \quad \dot{\hat{\theta}}_s = \begin{pmatrix} -\sin\theta_s \\ \cos\theta_s \end{pmatrix}^T$$

$$B_3 = p_f - (c+d)\hat{\theta}_f + \frac{5}{4}d^2\kappa_f\dot{\hat{\theta}}_f, \qquad \hat{\theta}_f = (\cos\theta_f, \sin\theta_f)^T, \quad \dot{\hat{\theta}}_f = \begin{pmatrix} -\sin\theta_f \\ \cos\theta_f \end{pmatrix}^T$$

$$B_4 = p_f - d\hat{\theta}_f, \qquad \hat{\theta}_f = (\cos\theta_f, \sin\theta_f)^T$$

$$B_5 = p_f = (x_f, y_f)^T$$

where $B_0$ may indicate location information of the start point, $B_1$, $B_2$, $B_3$ and $B_4$ may indicate location information of the adjusting points, $B_5$ may indicate location information of the final point, $(x_s, y_s, \theta_s, \kappa_s)$ may indicate state information of the platform at the start point, $(x_f, y_f, \theta_f, \kappa_f)$ may indicate state information of the platform at the end point, and a, b, c, and d may indicate path parameters.

In $(x_s, y_s, \theta_s, \kappa_s)$, $x_s$ may indicate an x-coordinate of the start point, $y_s$ may indicate a y-coordinate of the start point, $\theta_s$ may indicate a direction of the platform at the start point, and $\kappa_s$ may indicate a curvature at the start point.

In $(x_f, y_f, \theta_f, \kappa_f)$, $x_f$ may indicate an x-coordinate of the final point, $y_f$ may indicate a y-coordinate of the final point, $\theta_f$ may indicate a direction of the platform at the final point, and $\kappa_f$ may indicate a curvature at the final point.

As such, the adjusting point determiner 210 may determine the locations of the four adjusting points $B_1$, $B_2$, $B_3$ and $B_4$ by using the state information of the platform at the start point and at the final point and the four path parameters a, b, c, and d.

The Bezier curve generator 220 generates a Bezier curve, based on the adjusting points. The Bezier curve generator 220 may generate a quintic Bezier curve by using the four adjusting points $B_1$, $B_2$, $B_3$ and $B_4$ determined by the adjusting point determiner 210.

FIG. 3 is a flowchart of an optimal path generating method, according to an exemplary embodiment.

Referring to FIG. 3, the optimal path generating method according to an exemplary embodiment includes operation S310 in which the candidate path generator 110 of FIG. 1 generates a candidate path to be taken by a platform to move, operation S320 in which the section splitter 120 of FIG. 1 splits the candidate path into sections, operation S330 in which the curvature variation calculator 130 of FIG. 1 calculates a curvature variation for each of the sections, operation S340 in which the optimal path parameter acquirer 140 of FIG. 1 acquires the optimal path parameter that minimizes a sum of the curvature variations, and operation S350 in which the optimal path determiner 150 of FIG. 1 determines the optimal path corresponding to the optimal path parameter.

In operation S310, the candidate path generator 110 of FIG. 1 may generate the candidate path to be taken by the platform (e.g., the center point of the platform) to move from the start point to the final point. According to an exemplary embodiment, the candidate path generator 110 may generate the candidate path that connects the start point to the final point in a Bezier curve shape.

In operation S320, the section splitter 120 of FIG. 1 may split the candidate path into a preset number of sections. According to an exemplary embodiment, the section splitter 120 may split the candidate path into a plurality of sections at preset time intervals. According to an exemplary embodiment, the section splitter 120 may split the candidate path into a plurality of sections at preset distance intervals.

In operation S330, the curvature variation calculator 130 of FIG. 1 may calculate the curvature variation at each of the sections. According to an exemplary embodiment, the curvature variation calculator 130 of FIG. 1 may calculate a curvature variation of a specific section by dividing a difference between a curvature of a start point of the specific section and a curvature of a final point thereof by an interval of the specific section.

In operation S340, the optimal path parameter acquirer 140 of FIG. 1 may acquire an optimal path parameter that minimizes a sum of the curvature variations, by changing a path parameter of the candidate path. According to an exemplary embodiment, the optimal path parameter acquirer 140 may acquire an optimal path parameter that minimizes a sum of the squares of the curvature variations.

In operation S350, the optimal path determiner 150 of FIG. 1 may determine, as an optimal path, a candidate path corresponding to the optimal path parameter.

Figure 4:
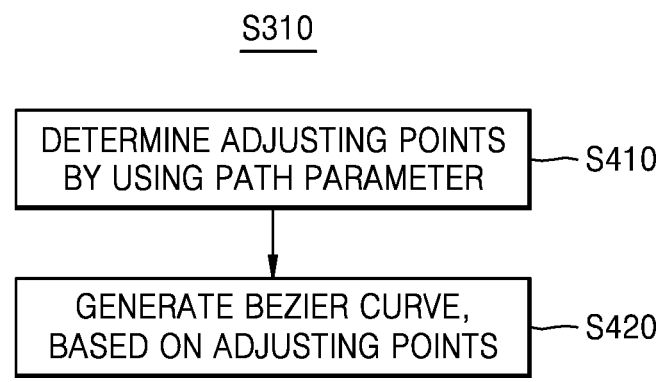
FIG. 4 is a flowchart of an example of operation of FIG. 3 of generating a candidate path, according to an exemplary embodiment.

FIG. 4 is a flowchart of an example of operation S310 of FIG. 3 of generating the candidate path, according to an exemplary embodiment.

Referring to FIG. 4, operation S310 of FIG. 3 of generating the candidate path includes operation S410 in which the adjusting point determiner 210 of FIG. 2 determines adjusting points by using a path parameter, and operation S420 in which the Bezier curve generator 220 of FIG. 2 generates a Bezier curve based on the adjusting points.

In operation S410, the adjusting point determiner 210 of FIG. 2 may determine four adjusting points by using state information of the platform at a start point, state information of the platform at a final point, and above Equation 2.

In operation S420, the Bezier curve generator 220 of FIG. 2 may generate a quintic Bezier curve by using the four adjusting points.

Figure 5:
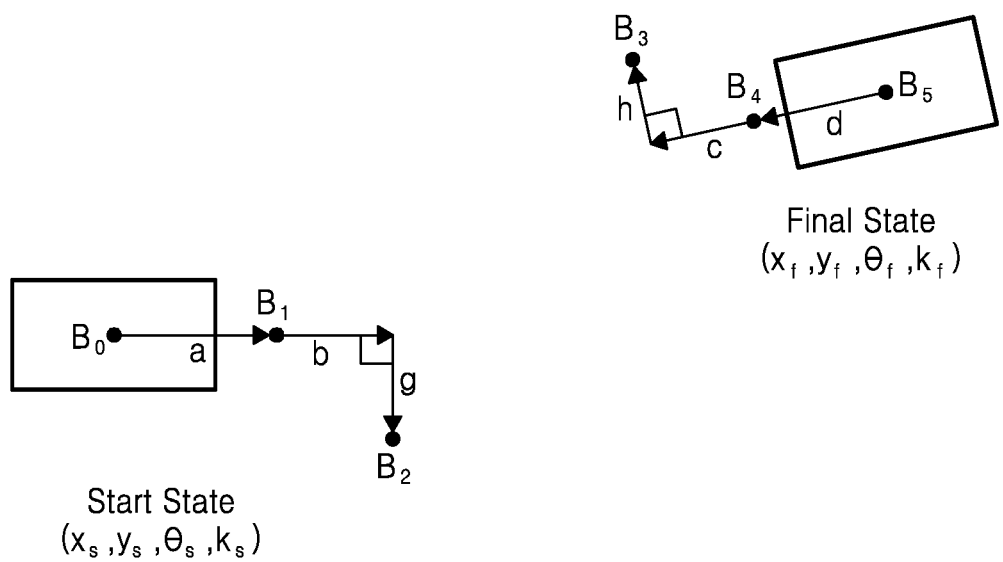
FIG. 5 illustrates state information of a platform of a start point and state information of a platform of a final point, according to an exemplary embodiment.

FIG. 5 illustrates state information of a platform at a start point and state information of the platform of a final point, according to an exemplary embodiment.

Referring to FIG. 5, state information of the platform at a start point $B_0$ is represented by $(x_s, y_s, \theta_s, \kappa_s)$, and state information of the platform at a final point $B_5$ is represented by $(x_f, y_f, \theta_f, \kappa_f)$.

In $(x_s, y_s, \theta_s, \kappa_s)$, $x_s$ may indicate an x-coordinate of the start-point, $y_s$ may indicate a y-coordinate of the start point, $\theta_s$ may indicate a direction of the platform at the start point, and $\kappa_s$ may indicate a curvature at the start point.

In $(x_f, y_f, \theta_f, \kappa_f)$, $x_f$ may indicate an x-coordinate of the final point, $y_f$ may indicate a y-coordinate of the final point, $\theta_f$ may indicate a direction of the platform at the final point, and $\kappa_f$ may indicate a curvature at the final point.

A path connecting the start point $B_0$ to the final point $B_5$ may be generated in a quintic Bezier curve shape based on four adjusting points $B_1$, $B_2$, $B_3$ and $B_4$. The four adjusting points $B_1$, $B_2$, $B_3$ and $B_4$ may be determined according to path parameters a, b, c, and d and above Equation 2.

Figure 6A:
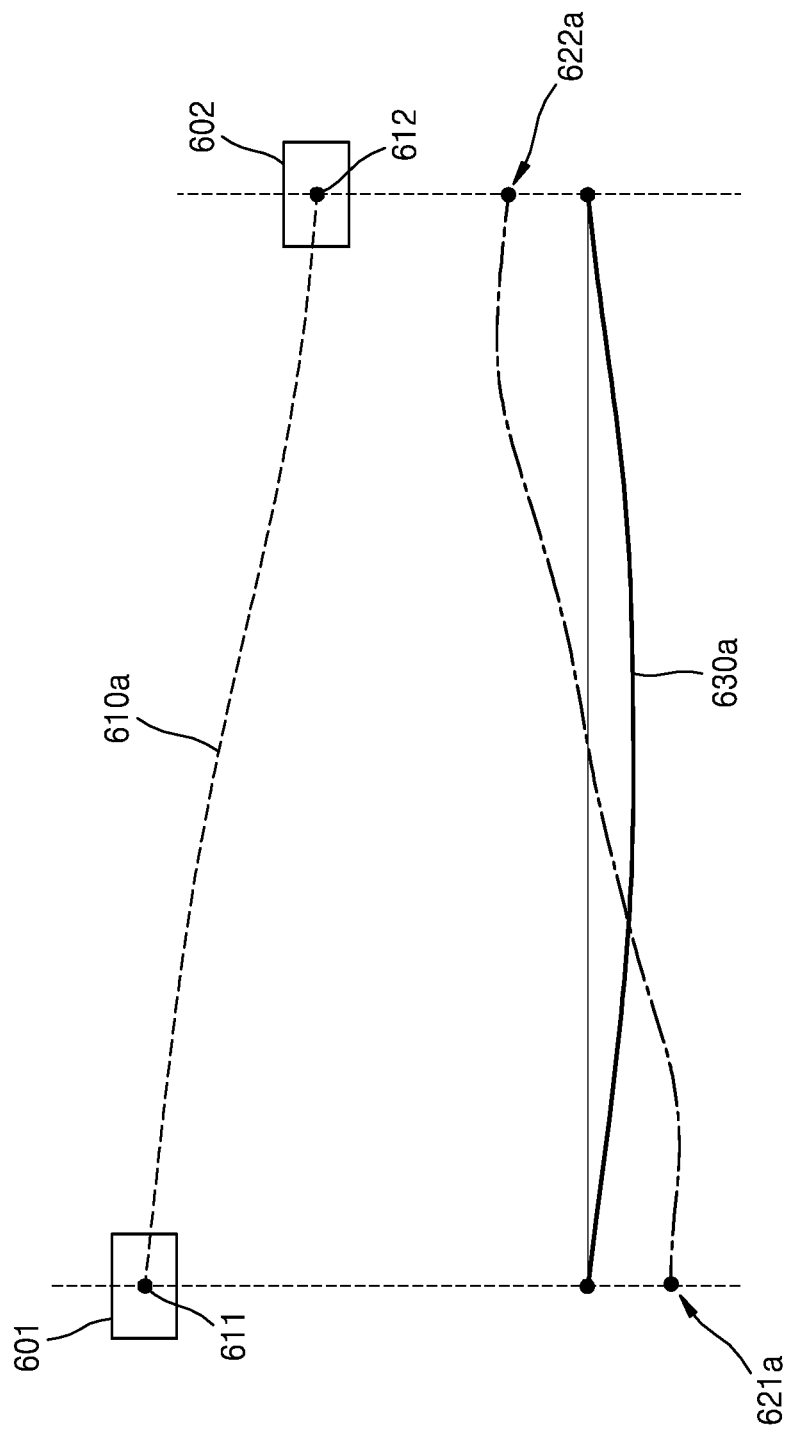
FIGS. 6A and 6B show a relationship between a movement path of a platform and a curvature variation, according to an exemplary embodiment.
Figure 6B:
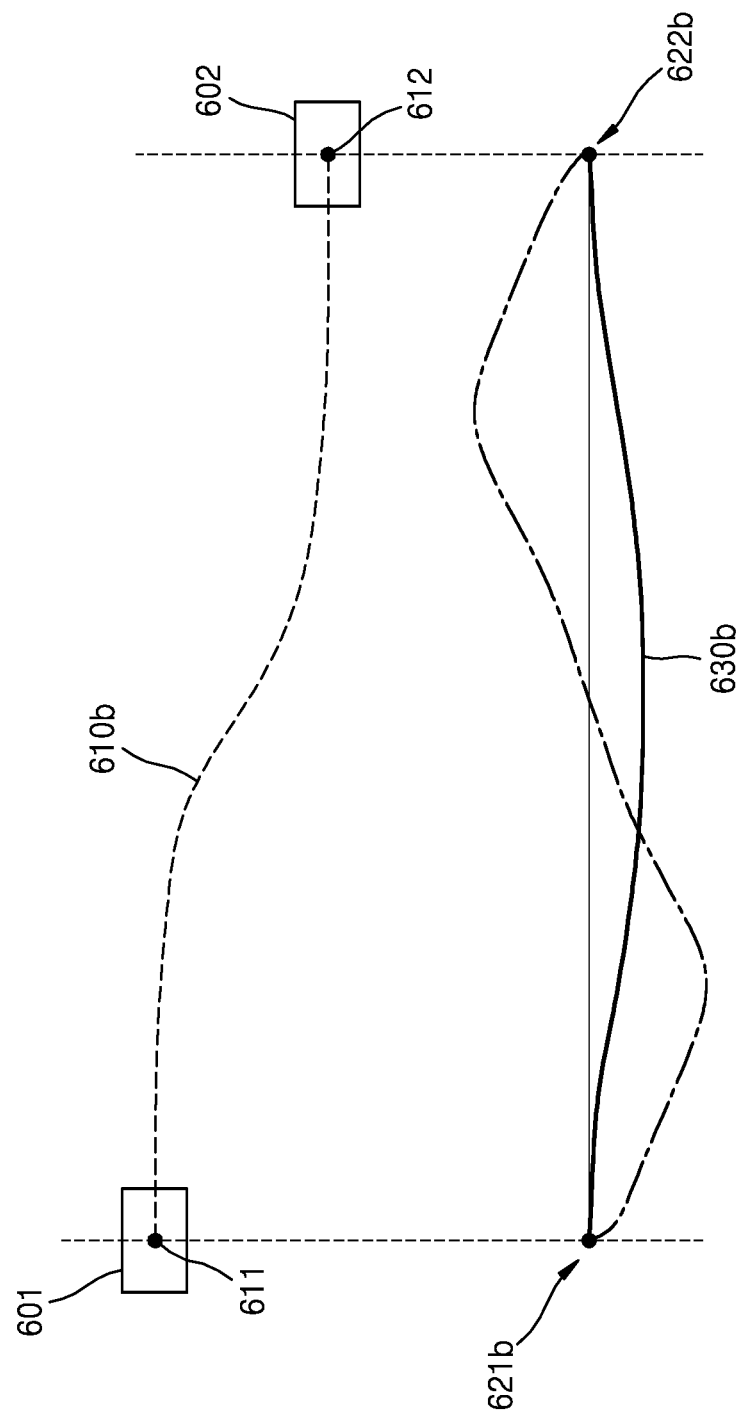

FIGS. 6A and 6B show a relationship between a movement path of a platform and a curvature variation, according to exemplary embodiments.

FIGS. 6A and 6B show a top view of a two-dimensional (2D) path of the platform, according to an exemplary embodiment, moving from a start state 601 to a final state 602.

First, as shown in FIG. 6A, in the optimal path generating method according to an exemplary embodiment, a candidate path 610*a* may be generated as a Bezier curve from a start point 611 to a final point 612.

The candidate path 610*a* may be generated using a preset path parameter.

Next, as shown in FIG. 6B, in the optimal path generating method according to an exemplary embodiment, the candidate path 610*a* may be split into a preset number of sections, a curvature variation at each of the sections may be calculated, an optimal path parameter that minimizes a sum of the curvature variations may be acquired by changing a path parameter of the candidate path 610*a*, and an optimal path 610*b* may be generated using the optimal path parameter.

In this case, curvatures 621*b* and 622*b* of a start point 611 and a final point 612 of the optimal path 610*b* are smaller than curvatures 621*a* and 622*a* of a start point 611 and a final point 612 of the candidate path 610*a*, and a curvature variation curve 630*b* of the optimal path 610*b* has a gentler inclination at the start point 611 and the end point 612 than a curvature variation curve 630*a* of the candidate path 610*a*.

As such, curvature variation is minimized at the start point 611 and the end point 612 of the optimal path 610*b*, according to an exemplary embodiment, and thus the platform has high realizability.

According to a method and an apparatus for optimal path generation of the above exemplary embodiments, a movement path having high realizability when a mobile robot is driven may be provided by minimizing a curvature variation between a start point and a final point of the mobile robot.

The above-described exemplary embodiment may be implemented in the form of a computer program executable via various elements on a computer. Such a computer program may be recorded on a computer readable medium. Examples of the computer readable medium include a magnetic medium (e.g., a hard disk, a floppy disk, or a magnetic tape), an optical medium (e.g., a compact disk-read-only memory (CD-ROM) or a digital versatile disk (DVD), a magneto-optical medium (e.g., a floptical disk), and a hardware device specially configured to store and execute program commands (e.g., a ROM, a random-access memory (RAM), or a flash memory). Examples of the computer readable medium may further include an intangible medium that may be transmitted over a network. For example, the computer readable medium may be a medium implemented as software or an application that may be transmitted and distributed over a network.

The computer program may be specially designed and configured for the above exemplary embodiments or may be well-known to and be usable by one of ordinary skill in the art of computer software. Examples of the computer program include advanced language codes that can be executed by a computer by using an interpreter or the like as well as machine language codes made by a compiler.

The particular implementations shown and described herein are illustrative exemplary embodiments and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus. Moreover, no item or component is essential to the practice of the inventive concept unless the element is specifically described as "essential" or "critical".

The exemplary embodiments should be considered in descriptive sense only and not for purposes of limitation. Descriptions of features or aspects within each embodiment should typically be considered as available for other similar features or aspects in other embodiments.

While the inventive concept has been particularly shown and described with reference to the above exemplary embodiments, it will be understood by those of ordinary skill in the art that various changes in form and details may be made therein without departing from the spirit and scope of the inventive concept as defined by the following claims.

What is claimed is:

1. A method for optimal path generation, the method comprising:
    generating a candidate path to be taken by a platform to move from a start point to a final point;
    splitting the candidate path into a preset number of sections;
    calculating a curvature variation of each of the sections by dividing a difference between a curvature of a start point of each of the sections and a curvature of a final point of each of the sections by an interval of each of the sections;
    acquiring an optimal path parameter that minimizes a sum of the curvature variations or a sum of squares of the curvature variations, by changing a path parameter of the candidate path;
    determining, as an optimal path, the candidate path corresponding to the optimal path parameter; and
    generating a movement path for a mobile robot based on the determined optimal path.

2. The method of claim 1, wherein the generating the candidate path comprises:
    determining adjusting points based on the path parameter; and
    generating a Bezier curve based on the adjusting points.

3. The method of claim 2, wherein the determining the adjusting points comprises determining a predetermined number of adjusting points based on the path parameter, state information of the platform at the start point, and state information of the platform at the final point, and
    wherein the generating the Bezier curve comprises generating a quintic Bezier curve based on the predetermined number of adjusting points.

4. The method of claim 3, wherein the state information comprises information about at least one of an x-coordinate, a y-coordinate, a direction, and a curvature.

5. The method of claim 3, wherein the state information comprises information about an x-coordinate, a y-coordinate, a direction, and a curvature.

6. An apparatus for optimal path generation, the apparatus comprising:
    a candidate path generator configured to generate a candidate path to be taken by a platform to move from a start point to a final point;
    a section splitter configured to split the candidate path into a preset number of sections;
    a curvature variation calculator configured to calculate a curvature variation of each of the sections by dividing a difference between a curvature of a start point of each of the sections and a curvature of a final point of each of the sections by an interval of each of the sections;

an optimal path parameter acquirer configured to acquire an optimal path parameter that minimizes a sum of the curvature variations, by changing a path parameter of the candidate path; and an optimal path determiner configured to determine the candidate path corresponding to the optimal path parameter as an optimal path and generate a movement path for a mobile robot based on the determined optimal path.

7. The apparatus of claim 6, wherein the candidate path generator comprises:
an adjusting point determiner configured to determine adjusting points based on the path parameter; and
a Bezier curve generator configured to generate a Bezier curve, based on the adjusting points.

8. The apparatus of claim 7, wherein the adjusting point determiner is configured to determine four adjusting points based on the path parameter, state information of the platform of the start point, and state information of the platform of the final point, and
wherein the Bezier curve generator is configured to generate a quintic Bezier curve based on the four adjusting points.

9. The apparatus of claim 8, wherein the state information comprises information about at least one of an x-coordinate, a y-coordinate, a direction, and a curvature.

10. The apparatus of claim 8, wherein the state information comprises information about an x-coordinate, a y-coordinate, a direction, and a curvature.

* * * * *